US012587129B2

(12) United States Patent
Sharpe

(10) Patent No.: US 12,587,129 B2
(45) Date of Patent: Mar. 24, 2026

(54) ELEVATED DUAL-AXIS PHOTOVOLTAIC SOLAR TRACKING ASSEMBLY

(71) Applicant: Stracker Incorporated, Ashland, OR (US)

(72) Inventor: Jeffery Charles Sharpe, Ashland, OR (US)

(73) Assignee: Stracker Incorporated, Ashland, OR (US)

( * ) Notice: Subject to any disclaimer, the term of this patent is extended or adjusted under 35 U.S.C. 154(b) by 0 days.

(21) Appl. No.: 17/193,102

(22) Filed: Mar. 5, 2021

(65) Prior Publication Data

US 2021/0194417 A1      Jun. 24, 2021

Related U.S. Application Data

(63) Continuation-in-part of application No. 15/989,875, filed on May 25, 2018, now abandoned.

(51) Int. Cl.
| | |
|---|---|
| *H01L 31/042* | (2014.01) |
| *G01S 3/786* | (2006.01) |
| *G05D 3/10* | (2006.01) |
| *H02S 20/32* | (2014.01) |
| *H02S 40/12* | (2014.01) |

(52) U.S. Cl.
CPC ............ *H02S 20/32* (2014.12); *G01S 3/7861* (2013.01); *G05D 3/105* (2013.01); *H02S 40/12* (2014.12)

(58) Field of Classification Search
CPC ........ H02S 20/32; H02S 40/12; G01S 3/7861; G05D 3/105
See application file for complete search history.

(56) References Cited

U.S. PATENT DOCUMENTS

| | | | |
|---|---|---|---|
| 4,172,739 | A | 10/1979 | Tassen |
| 5,622,078 | A | 4/1997 | Mattson |
| 6,284,968 | B1 | 9/2001 | Niesyn |
| 6,617,506 | B2 | 9/2003 | Sasaki |

(Continued)

*Primary Examiner* — Thanh Truc Trinh

(74) *Attorney, Agent, or Firm* — Procopio, Cory, Hargreaves & Savitch LLP

(57) ABSTRACT

An elevated dual-axis photovoltaic solar tracking assembly tracks the position of the sun with a high efficiency photovoltaic array, orienting photovoltaic array orthogonal to the sun, for optimal efficiency in generating electricity every minute of every day year-round. The assembly provides a pole, typically 20 feet, to elevate the photovoltaic array, thereby allowing a minimum 13 feet clearance from the ground at all times to retain use of the real estate space below the photovoltaic array. A structural frame carries photovoltaic array. A drive-core unit has two interdependent slew drives, driven by all-electric motors, to adjust positioning of photovoltaic array in the orthogonal orientation relative to sun while maintaining the photovoltaic array longitudinal axis orientation to the support pole. This drive-core unit includes the control system with GPS, anemometer, snow sensor and encoder transducers that provide data for a positional algorithm to calculate the sun's position, and move the photovoltaic array to optimally track it, at preset time intervals; as well as to move the array to other desired positions for wind and snow safety or owner preference. The control system energizes the slew drives via electric motors for movement and optimal sun tracking.

17 Claims, 8 Drawing Sheets

(56) References Cited

U.S. PATENT DOCUMENTS

| | | | |
|---|---|---|---|
| 6,680,693 B2 | 1/2004 | Urban et al. | |
| 7,793,654 B1 | 9/2010 | Thorne | |
| 8,381,718 B1* | 2/2013 | Luconi | F24S 30/452 |
| | | | 353/3 |
| 8,513,514 B2 | 8/2013 | Sherman | |
| 8,644,995 B2 | 2/2014 | Hinman et al. | |
| 8,895,836 B2 | 11/2014 | Amin et al. | |
| 9,074,797 B2 | 7/2015 | Miller et al. | |
| 9,270,225 B2 | 2/2016 | Clavelle et al. | |
| 9,496,441 B2 | 11/2016 | Park et al. | |
| 2006/0111214 A1* | 5/2006 | Yan | H02K 7/116 |
| | | | 475/5 |
| 2010/0089433 A1* | 4/2010 | Conger | H02S 20/10 |
| | | | 136/244 |
| 2011/0241604 A1* | 10/2011 | Anderson | B60L 53/52 |
| | | | 136/246 |
| 2012/0048340 A1 | 3/2012 | Qadir | |
| 2012/0193512 A1* | 8/2012 | Wu | G01S 3/7861 |
| | | | 250/203.4 |
| 2012/0285506 A1* | 11/2012 | Kuo | H02S 20/00 |
| | | | 136/246 |
| 2013/0048829 A1 | 2/2013 | Herniak | |
| 2014/0053825 A1 | 2/2014 | Zhon | |
| 2014/0174499 A1 | 6/2014 | Fitzgerald et al. | |
| 2014/0196761 A1 | 7/2014 | Tilley et al. | |
| 2015/0316639 A1 | 11/2015 | Russ et al. | |
| 2016/0154082 A1 | 6/2016 | Plourde et al. | |

* cited by examiner

ELEVATED DUAL-AXIS PHOTOVOLTAIC SOLAR TRACKING ASSEMBLY

This is a Continuation in Part Patent Application of Ser. No. 15/989,875, filed May 25, 2018.

BACKGROUND OF THE INVENTION

1. Technical Field

The present invention relates generally to a photovoltaic solar tracking assembly that tracks the position of the sun to convert sunlight into electrical energy. More so, the present invention relates to an elevated dual-axis photovoltaic solar tracking assembly that continuously and automatically tracks the position of the sun to convert sunlight into electrical energy.

2. Description of Prior Art

Those skilled in the art will recognize that solar energy is an important alternative power resource to help achieve the goal of sustainable development. Solar power has unique advantages such as it is clean, abundant, and it is produced during the day time when the electrical consumption is generally higher. The solar energy industry currently faces challenges of low harvest efficiency (~20%) of solar energy to usable electricity. Among the factors that contribute to the low harvest efficiency is the improper orientation of the photovoltaic array with respect to the sun. In addition, the loss of valuable real estate required for the building of solar power facilities plants has hindered adoption in many areas. Thus, accurate solar tracking is desirable because the amount of power generated by a given solar cell is related to the angle and amount of sunlight that impinges on it. Further, allowing use of valuable real estate below the photovoltaic array adds value to solar power installations.

Numerous attempts have been made to produce a solar tracking system which is capable of maintaining the desired orientation of a panel of solar cells or collectors at all times throughout the day and year. Even though these innovations may be suitable for the specific purposes to which they address, however, they would not be as suitable for the purposes of the present invention.

For example, U.S. Pat. No. 4,172,739 to Tassen discloses a sun tracker including a dual axis support for a drive-core unit in a first axis for providing movement of the tracker about a second axis by a system of cables in appropriate orientation with the sun throughout the day.

U.S. Pat. No. 5,622,078 to Mattson teaches a photovoltaic solar collector that is mounted on a retaining pipe. The retaining pipe rotates the collector from vertical to horizontal within a 2nd axis mount access.

U.S. Pat. No. 6,284,968 to Niesyn describes a solar-tracking system that provides a polar rotation at a constant velocity of 366.25 revolutions clockwise per year, and orbital revolution that is one revolution per year in the counter-clockwise direction.

U.S. Pat. No. 6,617,506 to Sasaki discloses a solar cell panel to follow and rotate at a required time to follow a movement of the sun, comprises a level support base fixed at the center support member; a set of first gears rotate the solar cell panel and a set of second deceleration gears function for controlling an inclination of the panel.

U.S. Pat. No. 6,680,693 to Urban et al. describes a method and apparatus to track position of the sun, the apparatus comprises a solar collector.

U.S. Pat. No. 7,793,654 to Thorne teaches a solar tracking system comprising a solar panel, a support base, and a panel configured for rotation about a vertical axis.

U.S. Pat. No. 8,513,514 to Sherman discloses an automated solar cell system and method to track the sun, wherein the solar cell system includes motors that adjust a position of solar cell array along different respective axes with respect to the sun.

U.S. Pat. No. 8,644,995 to Hinman et al. teaches a method for performing auto-configuration of a concentrated photovoltaic array comprising two-axis tracking mechanisms installed at the solar site based upon the GPS coordinates of each of the two-axis tracking mechanisms.

U.S. Pat. No. 8,895,836 to Amin et al. describes a dual axis solar tracker apparatus and method uses an azimuth actuator to adjust the azimuth of an attached solar panel and an elevation actuator to adjust the elevation of a panel seat holding the solar panel to track the azimuth and elevation of the sun as it moves through the sky.

U.S. Pat. No. 9,074,797 to Miller et al. discloses methods and apparatus for a two-axis tracking mechanism for a concentrated photovoltaic system.

U.S. Pat. No. 9,270,225 to Clavelle et al. describes a solar energy collector comprises a linearly extending receiver comprising a linearly extending support structure supporting a receiver and a reflector and pivotably mounted to accommodate rotation of the support structure, the reflector, and the receiver. Each of the receiver supports is tilted in a same direction along the rotation axis.

U.S. Pat. No. 9,496,441 to Park et al. teaches a solar cell module support assembly which achieves balanced support of a solar cell module and changes disposition angle and direction of the solar cell module according to altitude and direction of the sun by using sensors and a drive motor.

U.S. Pat. Application No. 20120048340 to Quadir teaches a solar tracking system for active tracking of a solar panel array relative to the sun's position includes photovoltaic sensors.

U.S. Pat. Application No. 20130048829 to Herniak discloses a system for comprising a parabolic solar concentrator that is moved by a mechanical alignment system for aligning the concentrator relative to the sun.

U.S. Pat. Application No. 20140053825 to Zhou describes a ganged single axis solar tracker and its drive unit having at least two rows of solar trackers and a drive unit.

U.S. Pat. Application No. 20140061430 to Yeh et al. teaches an apparatus for sensing an image sun position.

U.S. Pat. Application No. 20140230804 to Siddiqui et al. discloses a solar tracker that adjusts an azimuth of the solar device until an optimal solar exposure.

U.S. Pat. Application No. 20150316639 to Russ et al. teaches a tracking device comprising an at least one rotational drive to adjust a receiving structure of the device to track the sun on one or multiple axes with the aid of a control system by using an algorithm.

U.S. Pat. Application No. 20160154082 to Plourde et al. discloses a tracking device configured to track continuously or intermittently the sun. The tracking device calculates the position of the sun based on GPS information. The tracking device may employ one or more actuation assemblies to position the payload toward or relative to the sun.

U.S. Patent Publication 2014/0196761 is directed to a solar tracking assembly having a motor operable from a base mount towards a tracking from which a rotatable frame is coupled with a solar panel array.

U.S. Patent Publication 2010/0089433 which discloses a solar array support system posted above the ground on support columns and pad construction.

U.S. Patent Publication 2014/0174499 which claims a heliostat for reflective sunlight towards a target with a pair of independent spaced actuators to first rotate a support tube and a second actuator to independently rotate the heliostat mirror about a second axis in spaced relation to the first pole rotating actuator.

It is apparent now that numerous innovations that are adapted to a photovoltaic solar tracking assembly have been developed in the prior art that are adequate for various purposes. Furthermore, even though these innovations may be suitable for the specific purposes to which they address, accordingly, they would not be suitable for the purposes of the present invention as heretofore described. Thus an elevated dual-axis photovoltaic solar tracking assembly that continuously and automatically tracks the position of the sun in an orthogonal position to optimize conversion of sunlight into electrical energy while allowing full utilization of the space below the elevated assembly is needed.

SUMMARY OF THE INVENTION

The present invention relates to a solar tracking assembly mounted on an elevated support pole for tracking the position of the sun to generate electricity with a photovoltaic array. The unitized self-contained two-stage drive core unit is rotatably secured to the distal end of the support pole in an elevated position. The drive core unit comprises two independent integrated low voltage DC motors for rotation dual access of the photovoltaic array to relative sun position calculated by a control tracking mechanism inclusive of internal clock, global positioning system and sun positioning algorithm for array positioning to maintain optimal sun engagement and stowage position using slew drives, gear assemblies for bi-directional rotation on dual access planes. Robust component fabrication and integral unitized assembly of dual drive motors assures usability in atmospheric extreme conditions and ability for rapid detachment from the mounting pole via its modular configuration for ease of relocation and service, if needed.

DESCRIPTION OF THE DRAWINGS

The invention will now be described, by way of example, with reference to the accompanying drawings, in which.

4

Figure 6A:
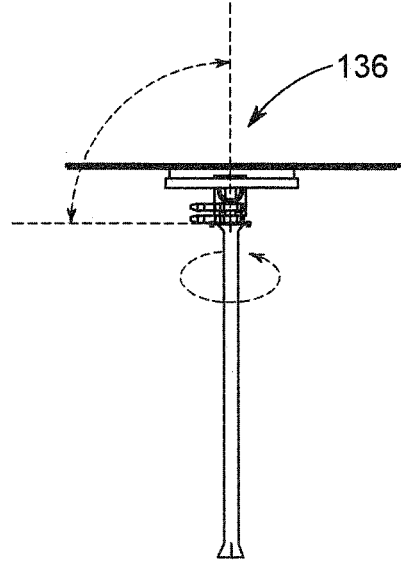
FIG. 6A illustrates a side view of the elevated dual-axis photovoltaic solar tracking assembly at stowed position, in accordance with an embodiment of the present invention.
Figure 6B:
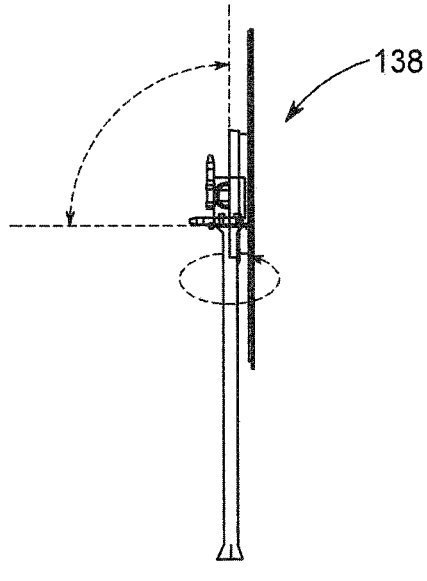
Figure 7:
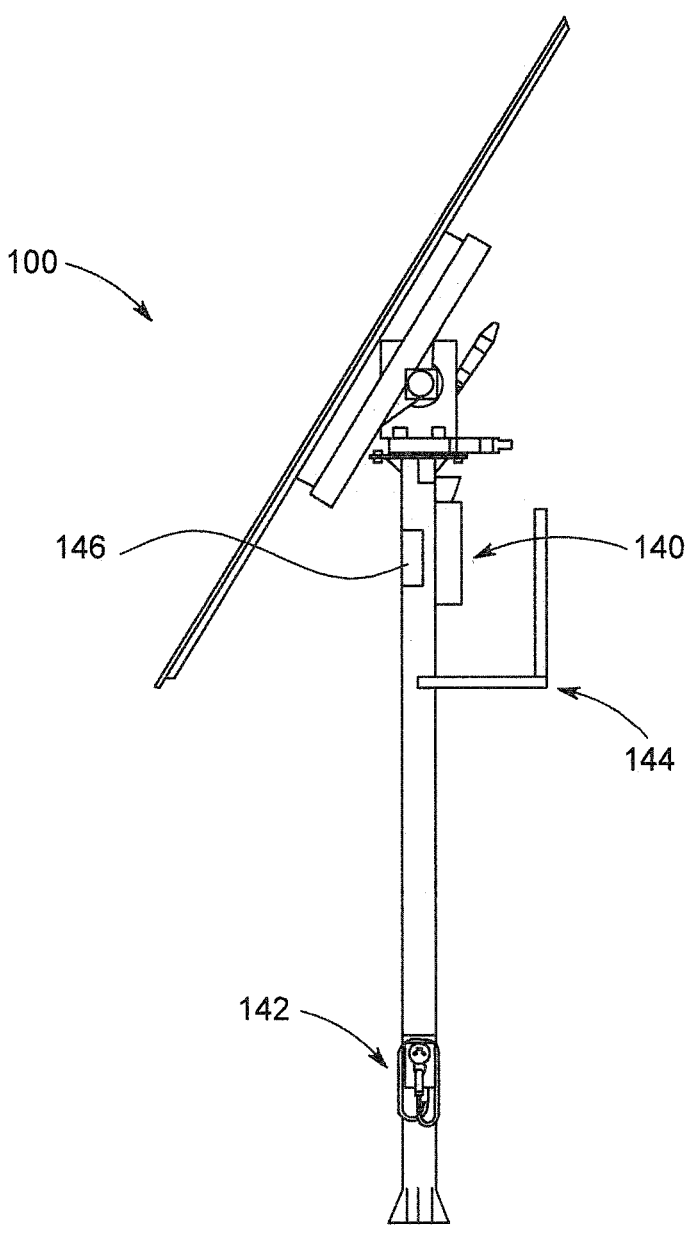
Figure 8:
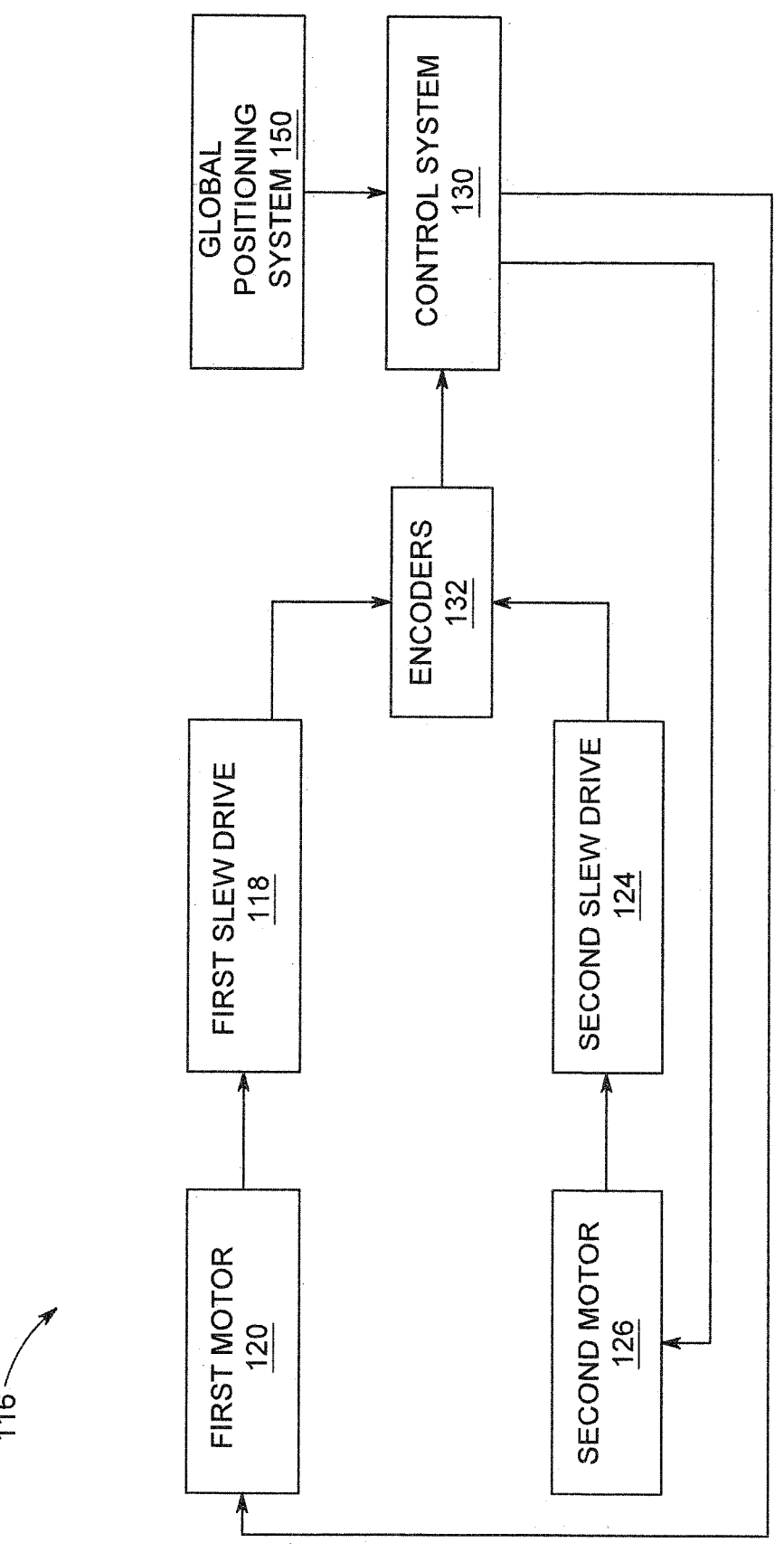

FIG. 6B illustrates a side view of the elevated dual-axis photovoltaic solar tracking assembly at vertical position, in accordance with an embodiment of the present invention;

FIG. 7 illustrates a side view of the elevated dual-axis photovoltaic solar tracking assembly showing an electrical vehicle charging outlet, a lighting system, a battery-backup system and a service platform in accordance with an embodiment of the present invention; and FIG. 8 illustrates a block diagram showing work flow of a drive-core unit in accordance with an embodiment of the present invention.

Like reference numerals refer to like parts throughout the various views of the drawings.

DETAILED DESCRIPTION OF THE INVENTION

Figure 1:
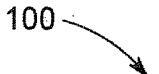
FIG. 1 illustrates a front perspective view of an exemplary elevated dual-axis photovoltaic solar tracking assembly, in accordance with an embodiment of the present invention.
Figure 1:
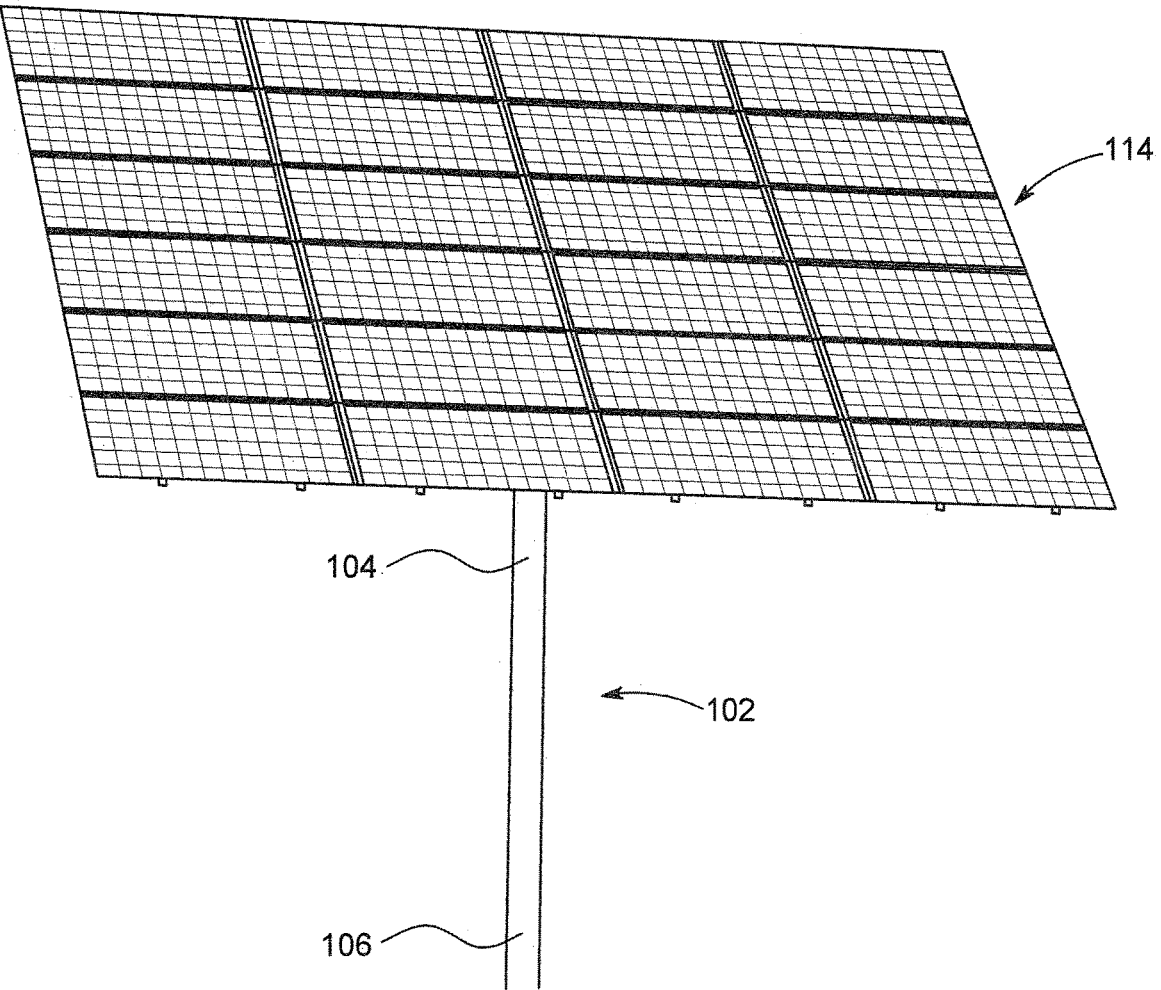
Figure 2:
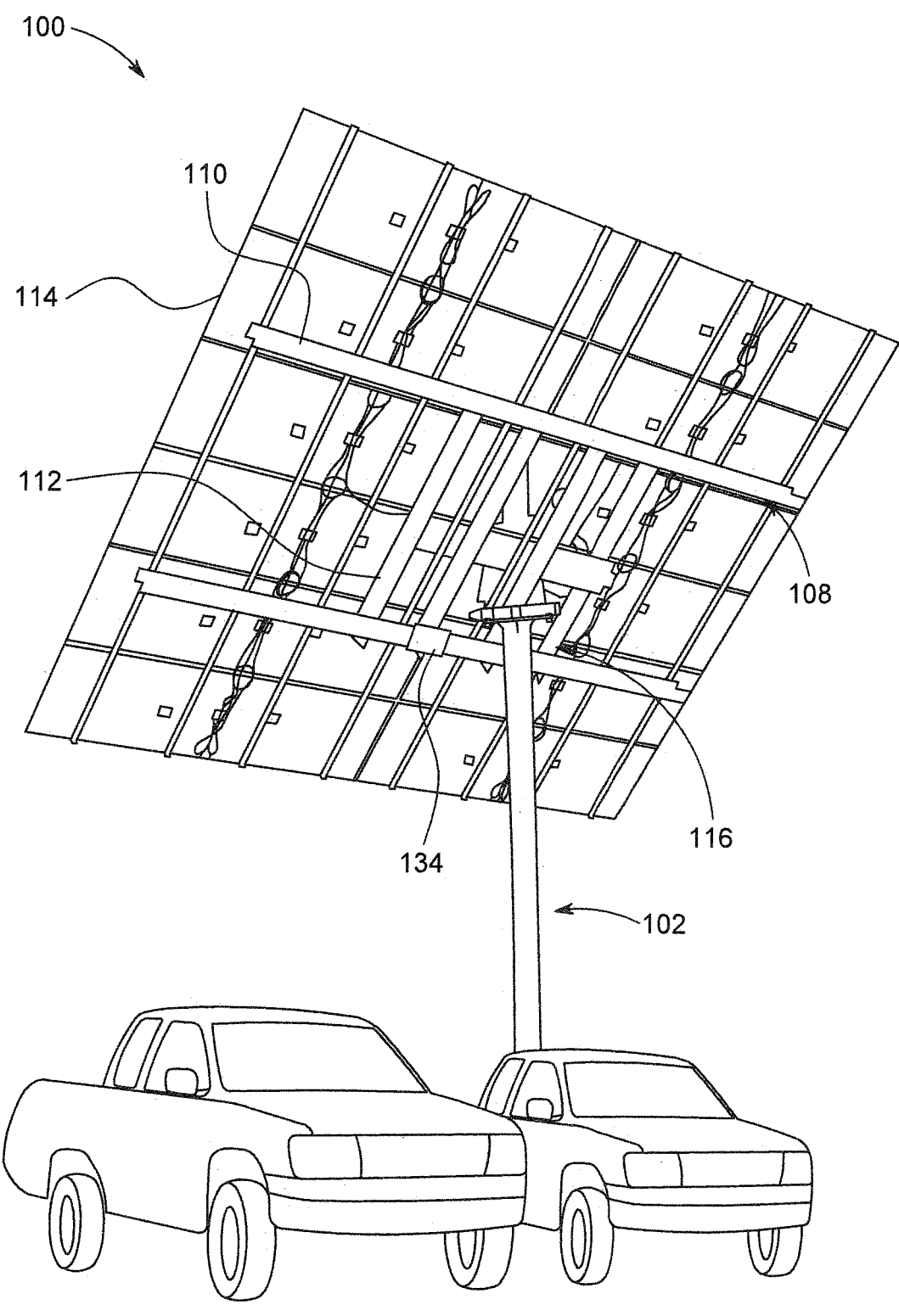
FIG. 2 illustrates a rear perspective view of the elevated dual-axis photovoltaic solar tracking assembly shown in FIG. 1, in accordance with an embodiment of the present invention.

Referring to FIGS. 1-8 of the drawings, an elevated dual axis photovoltaic solar tracking assembly, hereafter "assembly 100". The assembly 100, best seen in FIG. 1, provides an elongated pole 102 of variable length, typically ten to thirty feet height, wherein the pole is having a distal end 104 and a proximal end 106, the proximal end 106 is configured to be mounted on to a foundation surface or a ground surface, while the distal end 104 is configured attach a frame 108 to mount plurality of photovoltaic arrays 114 comprising the solar modules (panels) and inverter(s) 134 known in the art of solar energy generation. As shown in FIG. 2 the elongated pole allows to elevate the photovoltaic array 114 at a predetermined height above the ground surface, so as to maintain an elevated position keeping electrical and mechanical systems out of reach, and maintain continued use of the land below the assembly, while tracking the position of the sun to generate electricity therefrom. The electrical inverter(s) 34 are typically hung on the underside of the array, or may be mounted on the pole. The power produced can be Direct Current (DC), or single or three-phase Alternating Current (AC) in a variety of voltages. The entire assembly is engineering and tested to withstand wind speed of 125 mph when the assembly 100 is stowed in a flat/horizontal position. This strong design ensures the assembly to be accepted and applicable in schools, parking lots, residential buildings and market areas.

Referring now to FIG. 3-8, the assembly 100 provides a dual drive-core unit 116 consisting of two slew drives 118, 124 driven by low-voltage DC motors 120, 126. Each slew drive 118, 124 rotates the frame to adjust the positioning of the photovoltaic array 114 along a different respective axis in the orthogonal orientation relative to the sun and other desired orientations.

As seen in FIG. 8, the assembly 100 also provides a drive-core unit 116 comprising control system 130 utilizing a global positioning system 150 to track and calculate the position of the sun at preset intervals (typically at 7.5 to 10 minutes intervals). The control system 130 processes data from the internal clock verified by the global positioning system 150 signals and a positioning algorithm (not shown) to regulate the slew drives, motors, and encoders 132 for optimal tracking of the sun. The orientation of the photovoltaic array 114 is calculated using encoders 132 that provide information to the control system 130 which powers the slew drive motors 120,126 and monitors the slew drives 118, 124 worm gear rotations via the encoders 132 from a limit-switched position reset that is established at least every morning.

A mounting pole 102 being of variable length and typically ten to thirty feet long; easily unbolted and moved to other installation locations and able to safely support the entire tracker assembly 100 to maintain space below the assembly for compatible uses such as parking, recreation, business and agriculture; a frame 108 defined by horizontal beams 110 and vertical beams 112 arranged in a crossing pattern is detachably attached to the drive-core 116 unit which is in turn attached distal end 104 of the pole 102; the photovoltaic array 114 is being carried by the frame 108 in a parallel relationship; single or multiple electrical inverter (s) hung on the underside of the array 114, or mounted on the pole 102, whereby the power produced by the electrical inverter(s) can be converted to single or three-phase AC in a variety of voltages; the dual drive-core unit 116 has a first slew drive 118 comprising a first worm gear, is actuated by a first motor 120 to support radial and axial loads and moments while transmitting torque to a first drive torque arm 108 for rotating the frame 108 to a desired inclination angle between 0-90 degrees with respect to horizontal plane. A second slew drive 124 comprising a second worm gear actuated by a second motor 126 to support radial and axial loads and moments while transmitting torque to a second drive torque arm consisting of the pole 102 for rotating the frame to a desired angle between 0-360 degrees in the horizontal plane, whereby the first and second slew drives 118, 124 operate independently of each other. A control system 130 utilizing global positioning system 150 inputs provides a signal to the motors to operate the slew drives to the calculated position of the sun relative to the assembly 100 at regular preset intervals (typically every 7.5 minutes); the control system 130 further signals the motor 120 to operate the first slew drive 118 to move the array to the stowed position whenever winds exceed preset values (typically 30 mph) and at night, and optionally at user command or in the event of a power outage. Encoders 132 are in communication with the control system 130 as part of the drive-core mechanism 116, the encoders 132 providing information to the control system 130 to aid the control system 130 in calculating commands for the slew drives 118, 124, the encoders 132 monitoring the worm gear rotations of the slew drives 118, 124 from a limit-switched position reset that is established periodically.

In another aspect, the motors 120, 126 can be either direct current (DC) or Alternating current (AC) motors in any of a wide a variety of voltage inputs and utilize any appropriate gearing technology to move the arrays at predetermined speed.

In another aspect, the assembly 100 tracks the sun in an altazimuth motion.

In another aspect, the drive-core unit 116 moves the frame 108 to its most horizontal (stow) position in the event of high winds, at night, on user command from the optional user stow button, optionally on loss of system power, or optionally on command from a remote-control station.

The assembly 100 of the present invention helps overcome the problems of the prior art by elevating the photovoltaic array 114 of the assembly to at least twenty feet above the ground surface, thereby allowing continued use of valuable real estate below the photovoltaic array 114 for compatible uses while providing at least partial shading. Further the assembly 100 of the present invention allows tracking and following the path of sun in a manner that allows the photovoltaic array 114 to remain elevated and orthogonal to the sun at all times of the day for optimal harvest of sun energy for conversion to electrical energy. In addition, the assembly's height allows for optimizing energy harvest with the industry's current highest producing bifacial PV modules, which collect solar energy from the back, as well as the front, of the assembly. The modular pole design allows installation almost anywhere and the system height lifts the PV array 114 above the shade cast by trees and buildings in many circumstances. Thus, users, such as businesses and residences looking for solar energy, particularly those where traditional rooftop does not work, can use the assembly 100. Also owing to the minimum 13 feet ground clearance, under assembly 100 land use is maintained, and partially shaded, for most uses, such as car parking lots, homes, businesses, recreational and agricultural properties.

Figure 3:
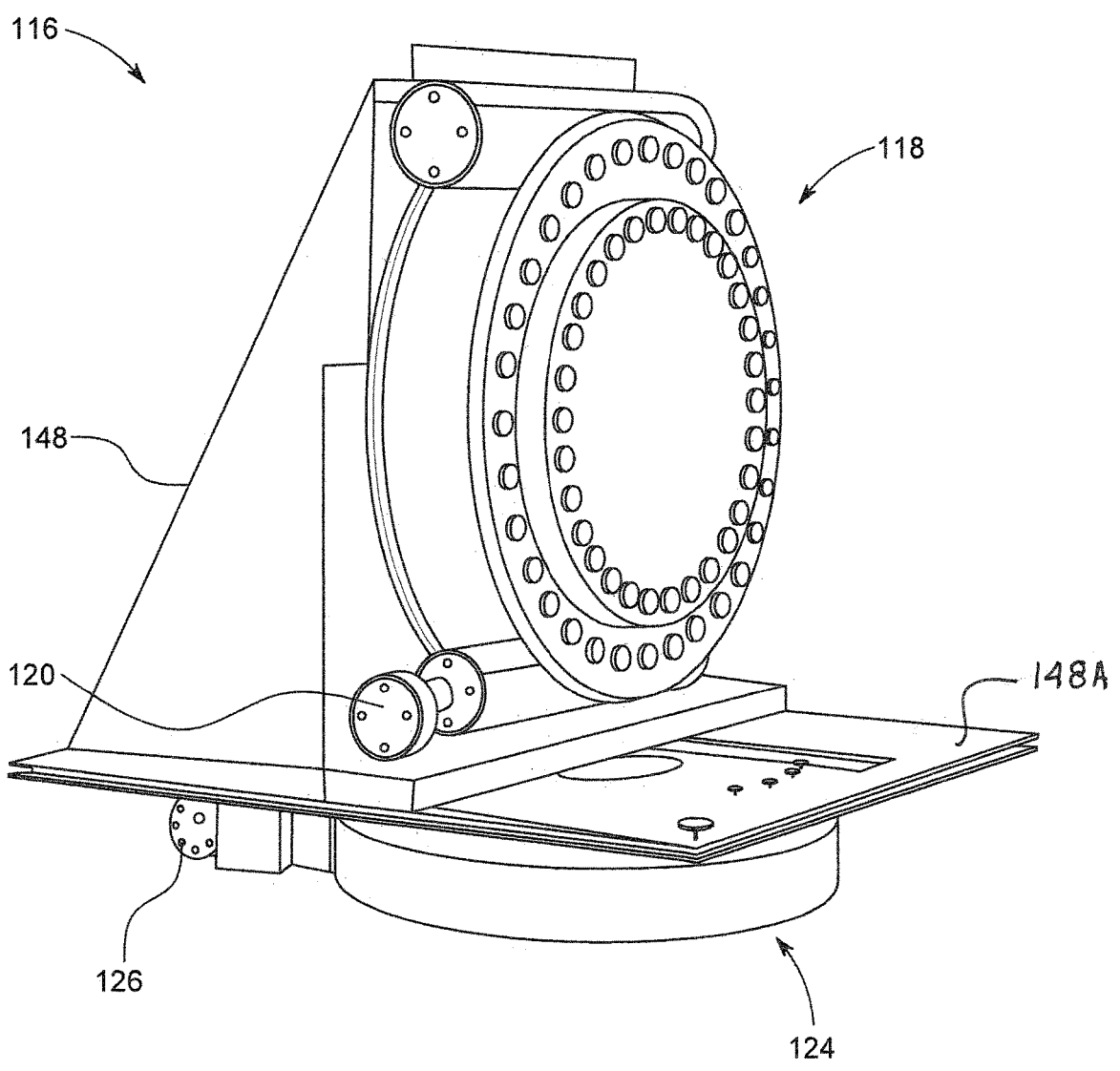
FIG. 3 illustrates a front perspective view of an exemplary drive-core unit, in accordance with an embodiment of the present invention.

As FIG. 3 illustrates, the drive-core unit 116 includes a variety of positioning controllers and processors, including two slew drives 118, 124, motors 120, 126, a control system 130, a positioning algorithm, a global positioning system 150, and encoders 132, that work together to enable articulation of the frame 108 in line with the sun, and thereby the photovoltaic array 114 is always maintained in a near orthogonal orientation with the altazimuth motion of the sun throughout the daytime; as well as enable efficient movement to the stow 136 or snow-shed positions 138 (shown in FIG. 6A-B) when appropriate.

Those skilled in the art will recognize that the elevated position of the photovoltaic array 114 creates two value propositions: (1) the efficiency of the photovoltaic array 114 is greatly increased because of the optimal orientation orthogonal to the sun at all times; and (2) real estate below is retained for compatible uses such as parking lots, picnic areas, feedlots, and the like.

Figure 4:
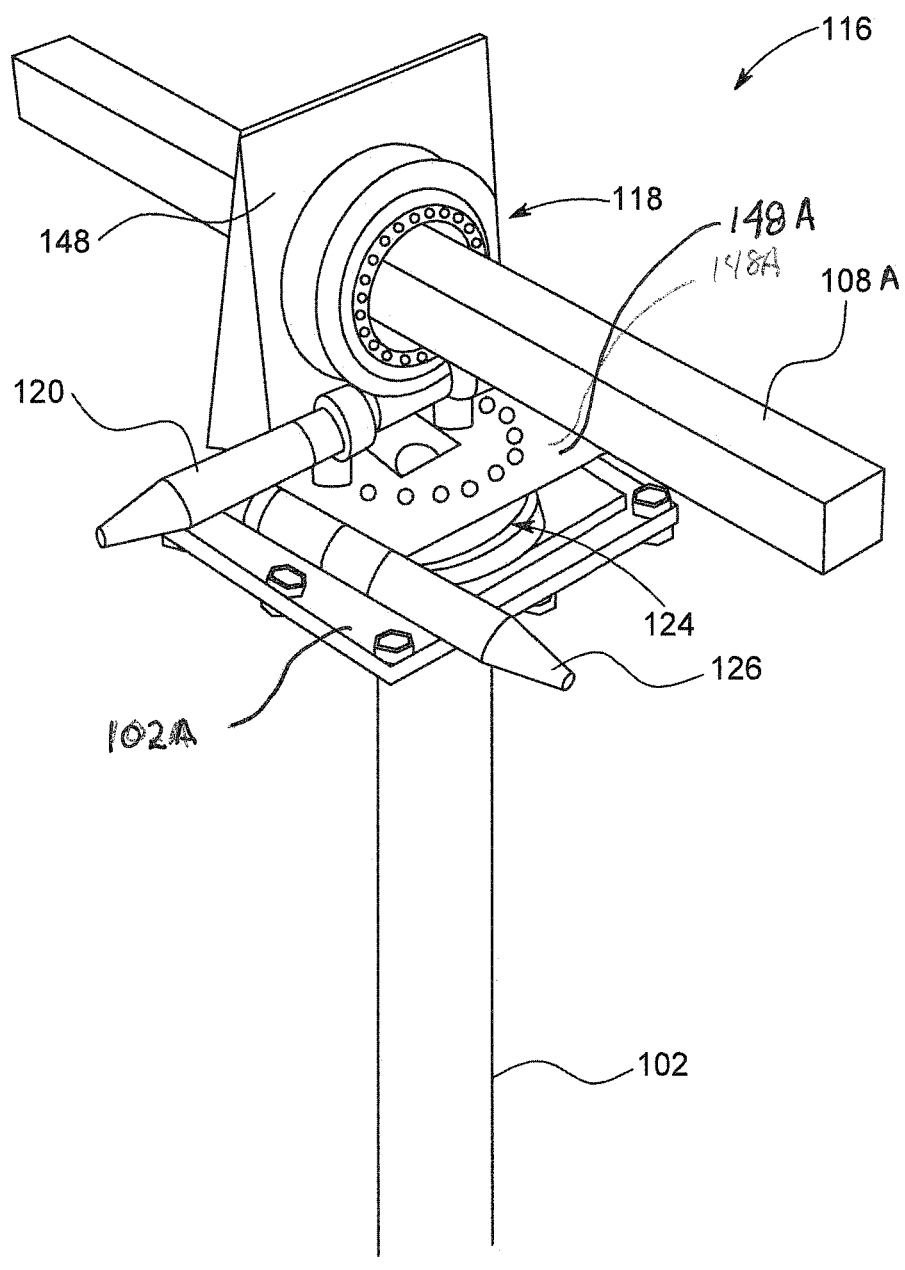
FIG. 4 illustrates a front perspective view of the drive-core unit shown in FIG. 3 attached to a frame and a pole, in accordance with an embodiment of the present invention.
Figure 5:
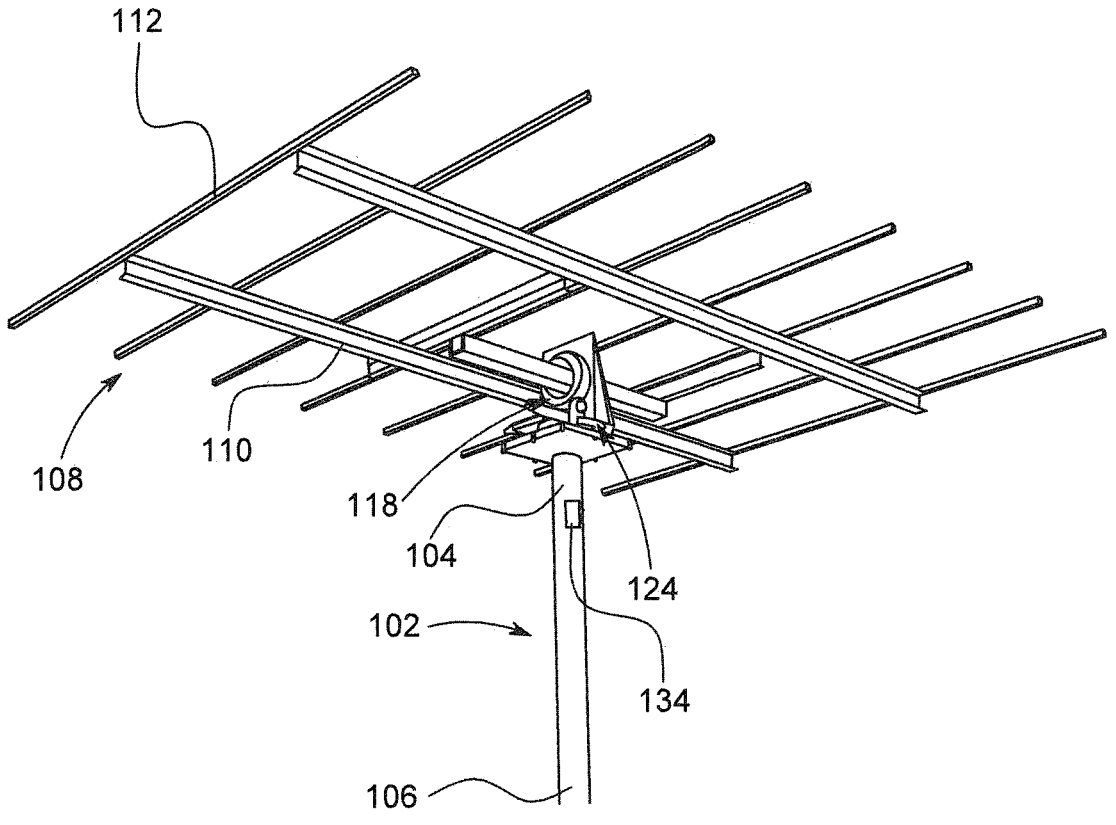
FIG. 5 illustrates a perspective view of the elevated dual-axis photovoltaic solar tracking assembly with the photovoltaic array detached from the frame, in accordance with an embodiment of the present invention.

Turning now to FIG. 4, the assembly 100 utilizes the dual drive-core unit 116 that articulates the frame 108 to a desired orientation relative to the sun, or the ground in snow and wind protection modes. The drive-core mechanism 116 comprises a first slew drive 118 and a second slew drive 124. The first slew drive 118 comprises a first worm gear known in the art to rotate in two directions, and in one plane. In one embodiment, the first slew drive supports structural radial and axial loads and moments while transmitting torque to a first drive torque arm 108A. The first drive torque arm 108A attaches to the frame 108 for rotating the frame 108 to a desired angle between 0-90 degrees with respect to horizontal plane. A first motor 120 powers the first slew drive 118. In one embodiment, the first motor 120 is a low voltage direct current motor. In another embodiment, the first motor 120 is an electric motor with planetary gears.

The second slew drive 124 of the dual drive core unit 116 supports both radial and axial structural loads and moments while transmitting torque to the distal end 104 of the pole 102. This second slew drive 124 attaches through the drive-core to the frame 108 for rotating the frame 108 to a desired angle between 0-360 degrees in the horizontal plane. In this manner, the first slew drive 118 and the second slew drive 124 independently rotate the frame 108 to position the photovoltaic array in an orthogonal orientation relative to the sun. A second motor 126 powers the second slew drive 124. In one embodiment, the second motor 126 is a low voltage direct current motor. In another embodiment, the second motor 126 is an electric motor with planetary gears. In one embodiment, eight bolts fasten the drive-core unit 116 to the pole. The drive-core unit 116 is fastened to the frame assembly 108 and the photovoltaic array 114 with an engineered bolt pattern typically consisting of 40 bolts. This simple detachability allows for easy replacement of components needing replacement or major repair.

In another non-limiting embodiment shown in FIGS. 2, 4, 5, 7 and 8, the assembly 100 includes a control system 130 as part of the drive-core unit 116, wherein the control system 130 may be mounted to the drive-core on the stiffener plate 148 (FIG. 3). The control system 130 is configured to communicate with the slew drives 118, 124 via the motors 120, 126, to regulate articulation of the frame 108 and the photovoltaic array 114 thereon. The control system 130 is adapted to process the signal transmitted from the global positioning system 150, anemometer, snow sensors and optional remote-control sensors (not shown). The control system 130 also processes a positioning algorithm to achieve optimal tracking of the sun. The positioning algorithm requires timers, satellite coordinates, and encoder coordinates to coordinate articulation of the frame 108 with the motion of the sun. The control system 130 can have an internet interface to allow users to monitor function and alarms related to the control system 130 and power drive-core unit 116 circuits. In one non-limiting embodiment, GPS is used to provide input to the control system 130.

The global positioning system 150 provides relevant information for the control system 130 allowing it to use an advance algorithm to know the position of the sun relative to the assembly 100 and position the array 114 to accurately track the sun at appropriate regular intervals (typically every 7.5 minutes).

In another non-limiting embodiment, the assembly 100 comprises encoders 132 that are in communication with the control system 130. The orientation of the photovoltaic array 114 is calculated using the encoders 132 that relay the current array 114 position to the control system 130 which then transmits commands to the relays of the motors 120, 126 to provide movement of the slew drives 118, 124 to properly move the array 114 to the optimal position. The encoders 132 monitor the worm gear rotations of the slew drives 118, 124 from a limit-switched position reset that is established periodically such as after any system reset and every morning.

In one embodiment, the control system 130 comprises devices, circuits, transducers, a software program and an algorithm that converts the processed information of the encoders 132 and the signals from the global positioning system 150, anemometer, snow sensor, button or remote-control location from one format or code to another, for the purposes of standardizing the motion of the drive-core unit 116.

In one alternative embodiment as shown in FIG. 7, the assembly 100 comprises an electrical vehicle charging station and electrical charging outlets 142 for charging electrical vehicles. The charging power is generated by the photovoltaic array 114 and augmented by standard power from the utility grid. In another alternative embodiment, the assembly 100 comprises a lighting system 146 for illuminating a parking lot and providing showcase lighting. The lighting power is generated by the photovoltaic array 114 and augmented by standard power from the utility grid. In yet another alternative embodiment, the assembly 100 comprises a battery-backup system 140 that automatically controls the drive mechanism 116 to orient the frame 108 to its safe stow position 136 on the loss of system power.

Referring now to FIGS. 3 and 4, the unitized dual drive modular drive core unit 116 is as noted characterized by the slew drivers 118 and 124. The slew driver 124 is attached to the distal end 104 of the pole 102 on a mounting support plate 102A of the drive core unit 116 assembly which is secured by multiple fasteners F that will allow for unitized removal and replacement as hereinbefore described.

One of the key aspects of the dual core unit 116 is therefore the utilization of the dual slew drives with the first slew drive 118 being mounted directly to the second slew drive 124 on a mounting frame 148A with the upstanding stiffener plate 148.

It will therefore be seen that while the horizontal access orientation of the second slew drive 124 provides for the drive core unit's 116 axial rotation relative the pole 102. Correspondingly, the first slew drive 118 upstanding angular orientation mounting on and extending directly from the second slew drive 124 provides for the photovoltaic array's mounting frame 108 rotating to the desired angle orientation between 0-360 in horizontal plane as hereinbefore described.

It will therefore be evident that due to this unique orientation of the photovoltaic array mounting frame 108, its effective center of gravity is positioned along the longitudinal axis of the support pole 102 affording enhanced resistance to extreme weather conditions.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

The invention claimed is:

1. A portable elevated dual axis photovoltaic solar tracking assembly comprising:

an elongated pole having a proximal end and a distal end, the pole length at least twenty feet in length, the proximal end is configured for removable mounting to a foundation surface;

an integrated dual drive core unit removably attached to the distal end of the elongated pole, said integrated dual drive core unit including a mounting frame with an upstanding stiffener plate, a second slew drive removably secured to the distal end of the elongated pole along a longitudinal axis of the elongated pole, and a first slew drive removably attached directly to the second slew drive along a rotational axis of the second slew drive, wherein the upstanding stiffener plate has a triangular shape with one of two side surfaces attached to the first slew drive and a bottom surface attached to the mounting frame and at least one encoder communicatively coupled with said first and second slew drives;

a control system communicatively coupled with said integrated dual drive core unit and a global positioning system, the control system configured to execute a positioning algorithm;;

a movable support frame extending from the integrated dual drive core unit, the movable support frame configured to rotate 0 degrees to 90 degrees with respect to a horizontal plane and rotate 0 degrees to 360 degrees in the horizontal plane;

at least one photovoltaic array carried by the movable support frame is in parallel relationship therewith, the at least one photovoltaic array comprising one or more solar panels;

a central portion of the movable support frame secured to and driven by said first slew drive, defining a rotational center of gravity for the movable support frame along the longitudinal axis of the elongated pole, the movable support frame removably attached to the second slew drive along the rotational axis of the second slew drive;

the integrated dual drive core unit enables movable support frame articulation in orthogonal orientation with both the azimuth motion of the sun and the elevation motion of the sun to position the one or more solar panels of the at least one photovoltaic array perpendicular to light from the sun; and the control system executes the positioning algorithm and controls the first and second slew drives to move the movable support frame and the at least one photovoltaic array carried by the movable support frame in orthogonal orientation with both the azimuth and elevation motion of the sun to position the one or more solar panels of the at least one photovoltaic array perpendicular to light from the sun, wherein the control system executes the positioning algorithm to re-position the at least one photovoltaic array carried by the movable support frame in orthogonal orientation with both the azimuth motion of the sun and the elevation motion of the sun to position the one or more solar panels of the at least one photovoltaic array perpendicular to light from the sun at preset intervals between 7.5 and 10 minutes.

2. The assembly of claim 1 wherein the rotational center of gravity of said movable support frame is maintained along a central vertical axis of the integrated dual drive core unit during movable support frame rotation in the horizontal plane and movable support frame rotation to a selective angle between 0-90 degrees with respect to the horizontal plane.

3. The assembly of claim 1, wherein the second slew drive comprises a second worm gear, the second slew drive being actuated by a second motor to rotate the second worm gear while transmitting torque to a second drive torque arm for rotating the frame to a desired angle between 0-360 degrees in the horizontal plane.

4. The assembly of claim 1, wherein the integrated dual drive core unit comprises a horizontal stowed position at an angle of zero degrees with respect to the horizontal plane and further comprises a vertical stowed position at an angle between sixty degrees and ninety degrees with respect to the horizontal plane.

5. The assembly of claim 1, wherein the first slew drive comprises a first worm gear and the second slew drive comprises a second worm gear, wherein the at least one encoder monitors the first and second worm gear rotations of the first and second slew drives to determine array rotation from a limit-switched position reset from the stowed position.

6. The assembly of claim 1, further comprising an electrical vehicle charging station and electrical charging outlets electrically connected to the photovoltaic array.

7. The assembly of claim 1, wherein the control system is further configured to:

process at least time data from an internal clock, the time data verified by the global positioning system;

track the position of the sun relative to the assembly based on at least the verified time data; and execute the positioning algorithm to regulate the slew drives, motors, and the at least one encoder for optimal tracking of the sun at preset intervals between 7.5 and 10 minutes.

8. The assembly of claim 1 wherein said first and second slew drives are removably secured directly to one another and to a mounting plate on the distal end of the elongated pole along the longitudinal axis of the elongated pole.

9. The assembly of claim 1, wherein the first slew drive comprises a first worm gear and the second slew drive comprises a second worm gear, wherein the at least one encoder monitors the first and second worm gear rotations of the first and second slew drives to determine array rotation from user reset.

10. The assembly of claim 1, wherein the pole is between twenty and thirty feet in length and the photovoltaic array is elevated between twenty feet and thirty feet above the foundation surface to allow compatible use of real estate below the photovoltaic array.

11. The assembly of claim 1, wherein the one or more solar panels comprise bifacial photovoltaic modules configured to collect solar energy from both the front of the solar panel and the back of the solar panel.

12. A photovoltaic solar tracking assembly comprising:

an elongated pole having a proximal end configured to removably attach to a foundation, and a distal end, the elongated pole at least twenty feet in length;

a mounting support plate configured to removably attach to the distal end of the elongated pole;

a frame comprising at least two horizontal beams and atleasttwo vertical beams, the frame configured to support a photovoltaic array in parallel relationship therewith, the photovoltaic array comprising one or more solar panels, the frame further configured to rotate 0 degrees to 90 degrees with respect to a horizontal plane and rotate 0 degrees to 360 degrees in the horizontal plane;

a dual drive-core unit comprising:

an upstanding stiffener plate having a triangular shape with two side surfaces and a bottom surface;

a mounting frame attached to the bottom surface of the upstanding stiffener plate;

a first slew drive configured to be driven by a first motor to rotate the frame in a first direction, the first slew drive mounted to the mounting frame and one of the two side surfaces of the upstanding stiffener plate; and a second slew drive configured to be driven by a second motor to rotate the frame in a second direction orthogonal to the first direction, the second slew drive mounted to the mounting frame and removably attached to the mounting support plate; and a control system communicatively coupled with the dual drive-core unit, the control system configured to execute a positioning algorithm and control the dual drive-core unit to control the first and second motors to drive the first and second slew drives to move the frame and the photovoltaic array to maintain orthogonal orientation with both the azimuth motion of the sun and the elevation motion of the sun to position the one or more solar panels of the photovoltaic array perpendicular to light from the sun.

13. The assembly of claim 12, further comprising a global positioning system (GPS) communicatively coupled with the control system, wherein the control system is further configured to receive GPS location information from the GPS and use the GPS location information to determine the next position of the photovoltaic array.

14. A method for maintaining orthogonal orientation between a photovoltaic solar tracking assembly and the sun, comprising:

providing a photovoltaic solar tracking assembly comprising:

an elongated pole having a proximal end configured to removably attach to a foundation, and a distal end;

a mounting support plate configured to removably attach to the distal end of the elongated pole;

a frame comprising at least two horizontal beams and at least two vertical beams, the frame configured to support a photovoltaic array;

a dual drive-core unit comprising:

an upstanding stiffener plate having a triangular shape with two side surfaces and a bottom surface;

a mounting frame attached to the bottom surface of the upstanding stiffener plate;

a first slew drive configured to be driven by a first motor to rotate the frame in a first direction, the first slew drive mounted to the mounting frame and one of the two side surfaces of the upstanding stiffener plate;

a second slew drive configured to be driven by a second motor to rotate the frame in a second direction orthogonal to the first direction, the second slew drive mounted to the mounting frame; and a control system communicatively coupled with the dual drive-core unit;

at a beginning portion of a daylight portion of a 24 hour cycle, controlling the dual drive-core unit to control the first and second motors to drive the first and second slew drives to position the photovoltaic array in orthogonal orientation with a current azimuth of the sun and a current elevation of the sun; and repeating the controlling of the dual drive-core unit to control the first and second motors to drive the first and second slew drives to re-position the photovoltaic array in orthogonal orientation with a current azimuth of the sun and a current elevation of the sun at a predetermined time interval.

15. The method of claim 14, further comprising orienting the photovoltaic array to a horizontal stowed position in response to receiving a signal from an anemometer system, the signal comprising wind speed information wherein a wind speed exceeds a predetermined threshold value.

16. The method of claim 14, further comprising orienting the photovoltaic array to within 30 degrees of vertical stowed position in response to receiving a signal from a snow detection system, the signal comprising snow load information wherein a snow load exceeds a predetermined threshold value.

17. The method of claim 14, further comprising:

processing at least time data from an internal clock of the photovoltaic solar tracking assembly, the time data verified by a global positioning system of the photovoltaic solar tracking assembly;

tracking the position of the sun relative to the photovoltaic solar tracking assembly based on at least the verified time data; and emitting a correlating positioning signal at the predetermined time interval, wherein the predetermined time interval is between 7.5 and 10 minutes.

*  *  *  *  *